United States Patent
Smadja et al.

(10) Patent No.: US 10,031,908 B2
(45) Date of Patent: Jul. 24, 2018

(54) SYSTEM AND METHOD FOR AUTOMATICALLY SUGGESTING DIVERSE AND PERSONALIZED MESSAGE COMPLETIONS

(71) Applicant: EXCALIBUR IP, LLC, New York, NY (US)

(72) Inventors: Yoelle Maarek Smadja, Haifa (IL); Nadav Golbandi, Haifa (IL)

(73) Assignee: EXCALIBUR IP, LLC, New York, NY (US)

(*) Notice: Subject to any disclaimer, the term of this patent is extended or adjusted under 35 U.S.C. 154(b) by 249 days.

(21) Appl. No.: 14/880,579

(22) Filed: Oct. 12, 2015

(65) Prior Publication Data
US 2016/0092432 A1 Mar. 31, 2016

Related U.S. Application Data

(63) Continuation of application No. 13/973,175, filed on Aug. 22, 2013, now Pat. No. 9,161,188.

(51) Int. Cl.
| | |
|---|---|
| H04W 4/14 | (2009.01) |
| H04W 4/02 | (2018.01) |
| G06F 17/27 | (2006.01) |
| G06F 3/048 | (2013.01) |
| H04M 1/00 | (2006.01) |
| H04L 12/58 | (2006.01) |
| H04L 29/08 | (2006.01) |
| H04W 4/12 | (2009.01) |

(52) U.S. Cl.
CPC ............ *G06F 17/277* (2013.01); *G06F 3/048* (2013.01); *G06F 17/276* (2013.01); *H04L 51/26* (2013.01); *H04L 67/22* (2013.01); *H04M 1/00* (2013.01); *H04W 4/14* (2013.01); *H04M 2250/70* (2013.01); *H04W 4/12* (2013.01)

(58) Field of Classification Search
CPC ................................ H04W 4/02; H04W 14/02
USPC .......................... 455/414.1, 414.2, 466, 411
See application file for complete search history.

(56) References Cited

U.S. PATENT DOCUMENTS

| | | | | |
|---|---|---|---|---|
| 2004/0029085 A1* | 2/2004 | Hu | ........................ | G06F 17/2745 434/178 |
| 2006/0235933 A1* | 10/2006 | Baluja | ................... | G06Q 10/107 709/207 |
| 2011/0083110 A1* | 4/2011 | Griffin | ................ | G06F 3/04886 715/863 |
| 2012/0089925 A1* | 4/2012 | Perry | ...................... | G06F 17/24 715/752 |

(Continued)

*Primary Examiner* — Kamran Afshar
*Assistant Examiner* — Farideh Madani
(74) *Attorney, Agent, or Firm* — James J. DeCarlo; Greenberg Traurig, LLP

(57) ABSTRACT

Disclosed is a system and method for suggesting messages that are automatically learned, personalized and diversified by leveraging messages sent by a large number of users in order to provide message completions that are as engaging as possible. The disclosed systems and methods learn from recurrent messages sent to a recipient, and suggest message completions based upon user behavior. The systems and methods compute a ranked list of suggested message completions after every key stroke or character input, and if the list satisfies a given confidence threshold, it is returned and displayed to the user.

13 Claims, 9 Drawing Sheets

(56) References Cited

U.S. PATENT DOCUMENTS

2015/0046263 A1* 2/2015 Seo .................. G06Q 30/02
                                              705/14.64

* cited by examiner

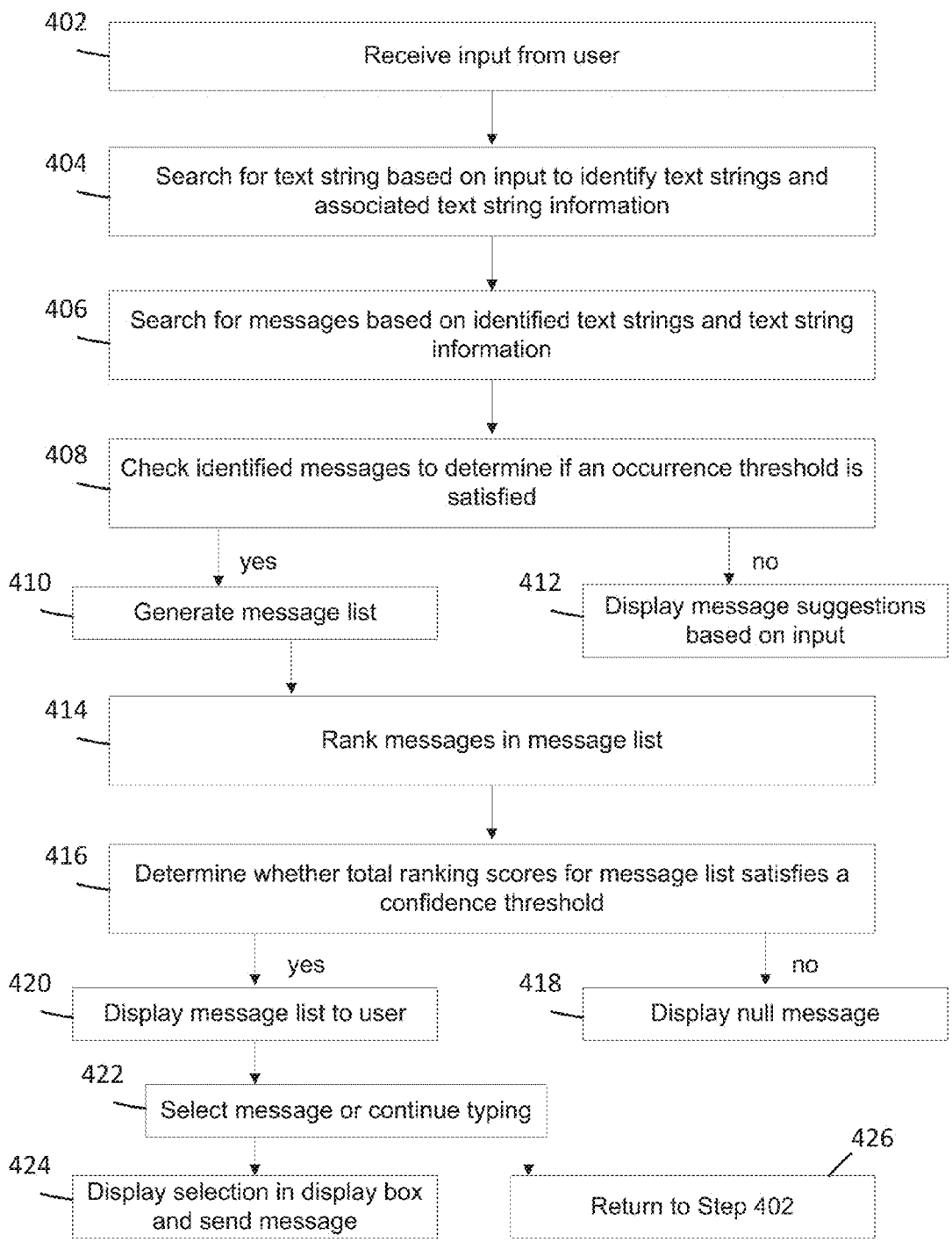

SYSTEM AND METHOD FOR AUTOMATICALLY SUGGESTING DIVERSE AND PERSONALIZED MESSAGE COMPLETIONS

This application is a continuation of and claims priority from co-pending U.S. patent application Ser. No. 13/973,175, filed on Aug. 22, 2013, entitled "SYSTEM AND METHOD FOR AUTOMATICALLY SUGGESTING DIVERSE AND PERSONALIZED MESSAGE COMPLETIONS," which is incorporated herein in its entirety by reference This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to suggesting a word and/or phrase to a user based at least on one or more characters input by a user, and more particularly, to systems and methods for predicting diverse and personalized message completions.

RELATED ART

Text-prediction (also referred to as auto-completion) techniques are commonly used to predict a word or phrase that a user is inputting based upon one or more characters that the user has already inputted. Currently, such techniques are used by a wide array of applications to increase the speed and efficiency with which users input text. Such techniques are commonly used in conjunction with SMS applications (e.g., text messaging applications) and/or email applications on mobile devices.

SUMMARY

The present disclosure discloses a system and method for predicting or suggesting diverse and personalized message completions. The user input aspects on mobiles devices (e.g., the qwerty keyboards, the touchscreens, and the like) are generally limited and can hamper a user's ability to accurately and efficiently input text; therefore, auto-complete (or text-prediction) techniques are used to assist the user in quickly generating an accurate string of characters and/or promoting the correct spelling of words. The disclosure herein involves augmenting existing messaging applications with a message suggestion feature(s) or capability that learns from recurrent messages sent to a recipient in order to provide, via suggestion or prediction, a personalized and diversified list of possible full message completions. The systems and methods discussed herein lend towards increased productivity and user experience in messaging applications by leveraging messages sent by a large number of users in order to make the message completions as engaging as possible. Therefore, based on the sender(s), recipient(s) and/or prefix strings (or character entries for a message), the present disclosure can suggest an improved list of message completions.

In accordance with one or more embodiments, a method is disclosed which includes receiving, at a computing device over a network, message input entered by a first user in a messaging application running on a mobile device associated said first user, said message input responsive to said first user drafting a message for delivery to a second user, said message input comprising a character string of at least one character, an identifier of said first user and an identifier of said second user; determining, via the computing device, a word listing that corresponds to the message input, said word listing comprising word strings that begin with said character string, said determining comprises identifying scores associated with each word string based upon said first user identifier and said second user identifier; determining, via the computing device, a message suggestion listing based on said word listing, said message suggestion listing comprising a set of messages, each of said messages having an associated occurrence score above an occurrence threshold; ranking, via the computing device, the messages within the message set based on a ranking score for each message, said ranking scores comprising identified scores associated with each words string and the occurrence scores for each message in the message set; and facilitating display, via the computing device, of the ranked message set to said first user within said message application.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for predicting diverse and personalized message completions.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 4 is a flowchart illustrating steps performed in accordance with an embodiment of the present disclosure;

DESCRIPTION OF EMBODIMENTS

Figure 1:
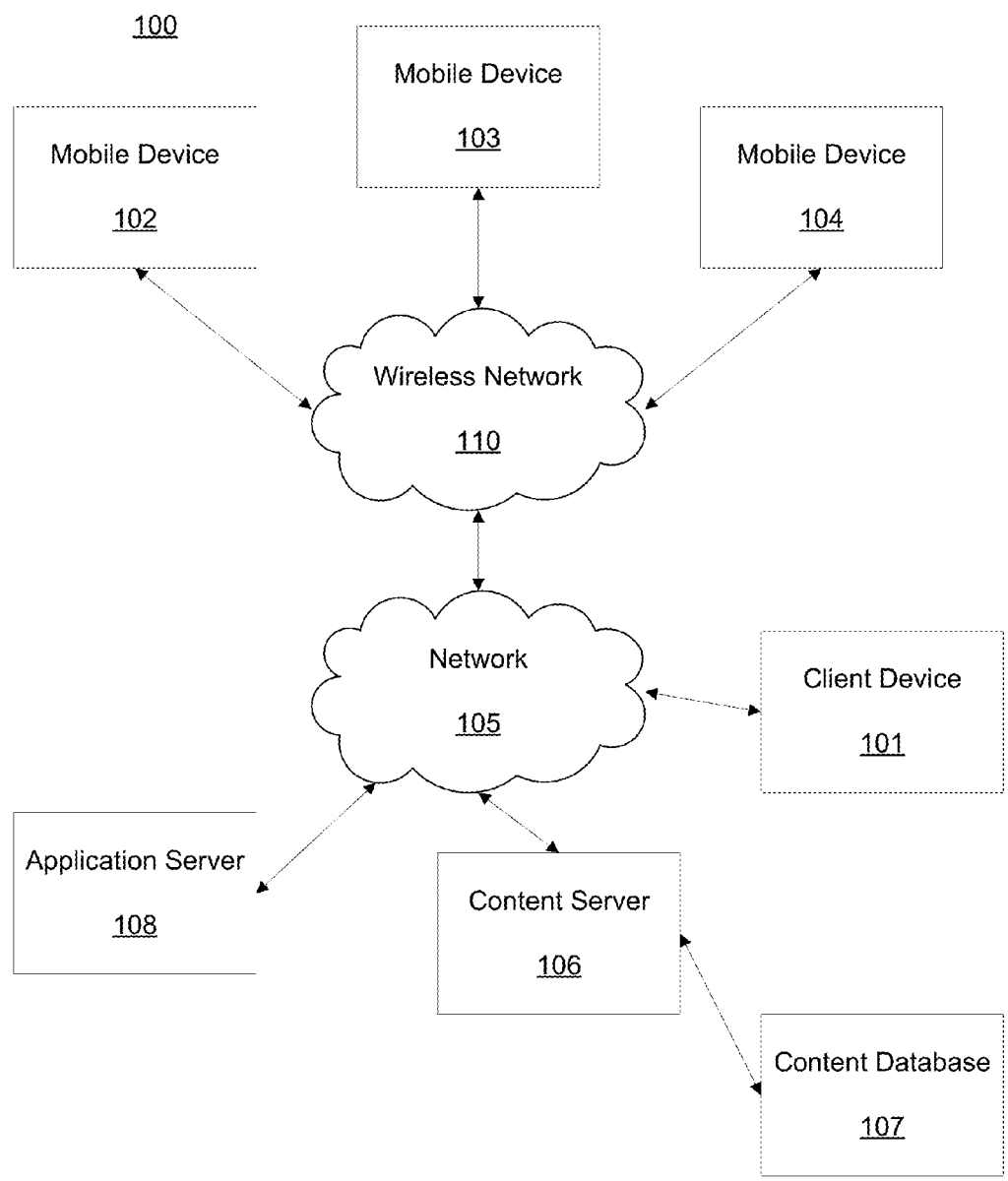
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. Conventional auto-complete features, such as those commonly found in text messaging applications (e.g., Short Message Service (SMS) or other Instant Messaging applications), predict a word and/or phrase a user is inputting based upon a set of one or more characters that the user has previously inputted. The more characters that the user inputs, the narrower the field of possible words/phrases, and generally, the better the prediction can become. One common implementation involves applying a probability of related words (or phrases) that have a prefix that matches the character(s) the user has input (or selected). For example, upon a user entering a character "J", conventional systems would identify respective words beginning with a letter "J" based on a prefix hierarchy, where "J" is the root within the hierarchy tree. Here, a probability for words (or phrases) respective the root character, e.g., "J", would be computed and the words that are deemed more probable would be identified and presented to the user. This probability application exhibits the limitations in the current state of the art. That is, the majority of messages are sent to a limited number of contacts, and messages to the same contacts are often repetitive; therefore, message completions are often repetitive, conventional and often computationally insensitive.

The presently disclosed systems and methods describe improved systems and methods for suggesting messages that are automatically learned, personalized and diversified by leveraging messages sent by a large pool of users in order to make the message completions as engaging as possible. The disclosed systems and methods can augment any existing text messaging application via a personalized message suggestion feature that does not require applications of probabilities respective saved templates of words/phrases. In some embodiments, the systems and methods disclosed can be embodied as a messaging application, and in some embodiments, the capabilities described herein can be embodied as an added feature to existing or to be known messaging applications.

Further, in today's mobile devices (e.g., iPhone®), a user can define "keyboard shortcuts," which can be used to store SMS templates. Thus, content will be displayed for selection as soon as the name of the shortcut is entered in the SMS or other text box. For example, as soon as a user enters "omw", current applications will determine that this means "on my way" and such message completion will be displayed in the user's text entry box for selection. In contrast, the disclosed systems and methods do not require manually defining or pre-designation of any template. The systems and methods discussed herein learn from recurrent messages sent to a recipient, and instead of simply offering a user a direct completion, as performed by many auto-completion and search query completion services today, for example, the suggested (or predicted) message completions are based upon user behavior and personalized respective each user's intent.

Indeed, message completion services are critical as typing can be a tedious task, especially on mobile devices. However, current completion services have been mostly reserved to query or command completion and have not been applied to personalized services, such as messaging, chat or SMS. Thus, the disclosed systems and methods are adapted to provide, via suggestion or prediction features/services/applications, a personalized and diversified list of possible full message completions.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106 and application (or "App") server 108.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, share photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. Wireless network 110 may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102-104 and another computing device, network, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between content servers 106, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within a social networking site. A social network refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, email services, web services, third-party services, audio services, video services, email services, instant messaging (IM) services, SMS services, MMS services, FTP services, voice over IP (VOIP) services, or the like. Examples of content may include images, text, audio, video, or the like, which may be processed in the form of physical signals, such as electrical signals, for example, or may be stored in memory, as physical states, for example.

Servers 106 and 108 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In an embodiment, users are able to access services provided by servers 106 and/or 108. This may include in a non-limiting example, email servers, social networking servers, SMS servers, IM servers, MMS servers, exchange servers, photo-sharing services servers, and travel services servers, via the network 105 using their various devices 101-104. In some embodiments, applications, such as instant messaging applications and other known messaging platforms, can be hosted by the application server 108. Thus, the application server 108 can store various types of applications and application related information including application data and user profile information. It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates content server 106 and application server 108 as single computing devices, respectively, the disclosure is not so limited. For example, one or more functions of content server 106 and/or application server 108 may be distributed across one or more distinct computing devices. Moreover, in one embodiment, content server 106 and application server 108 may be integrated into a single computing device, without departing from the scope of the present disclosure.

Figure 2:
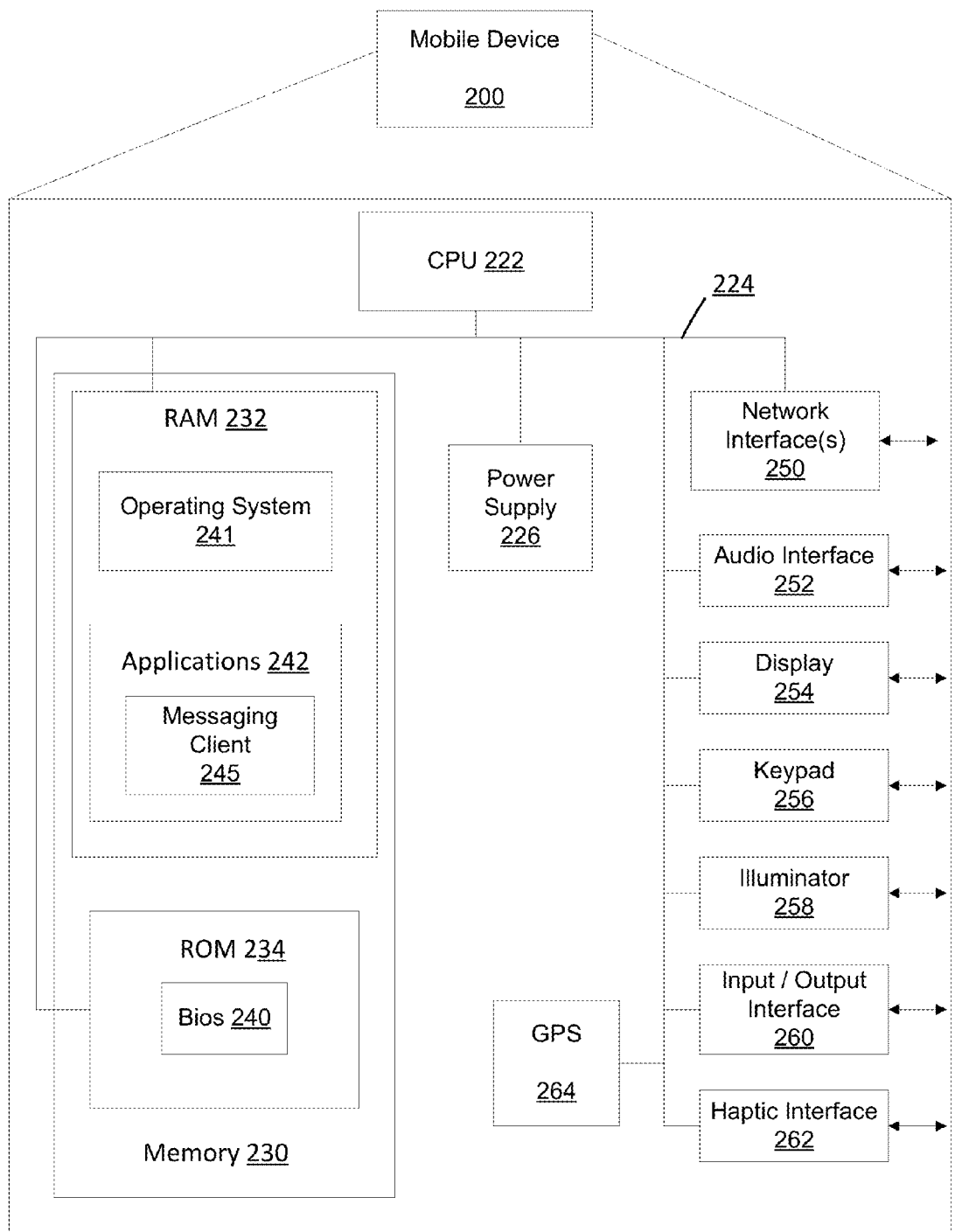
FIG. 2 depicts is a schematic diagram illustrating a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 300.

Applications 242 may include computer executable instructions which, when executed by Client device 200, transmit, receive, and/or otherwise process audio, video, images, and enable telecommunication with another user of another client device. Other examples of application programs include calendars, browsers, contact managers, task managers, transcoders, database programs, word processing programs, security applications, spreadsheet programs, games, search programs, and so forth. Applications 242 may further include messaging client 245 that is configured to send, to receive, and/or to otherwise process messages using SMS, MMS, IM, email, VOIP, and/or any of a variety of other messaging communication protocols. Although a single messaging client 245 is illustrated it should be clear that multiple messaging clients may be employed. For example, one messaging client may be configured to manage SMS messages, where another messaging client manages IM messages, and yet another messaging client is configured to manage serving advertisements, emails, or the like.

Having described the components of the general architecture employed within the disclosed systems and methods, the components' general operation with respect to the disclosed systems and methods will now be described. Preferred embodiments of the present disclosure involve character (e.g., text) input on mobile devices, including known and to be known mobile devices and mobile technology, which includes, but is not limited to, multi-touch and portable devices as those discussed above. However, applications of the present disclosure should not be construed to limit embodiments discussed herein to solely mobile devices, as the systems and methods discussed herein are applicable to all types of computing devices, whether known or to be known, where character entry is input by a user via the devices' input functionality associated with or attached to such devices. Indeed, it should also not be construed to limit the instant disclosure to character entry, e.g., text, in that embodiments exist where the input can be an image, video or audio file, or other multi-media file, in addition to emoticons and other types of inputs received through messaging applications.

Figure 3:
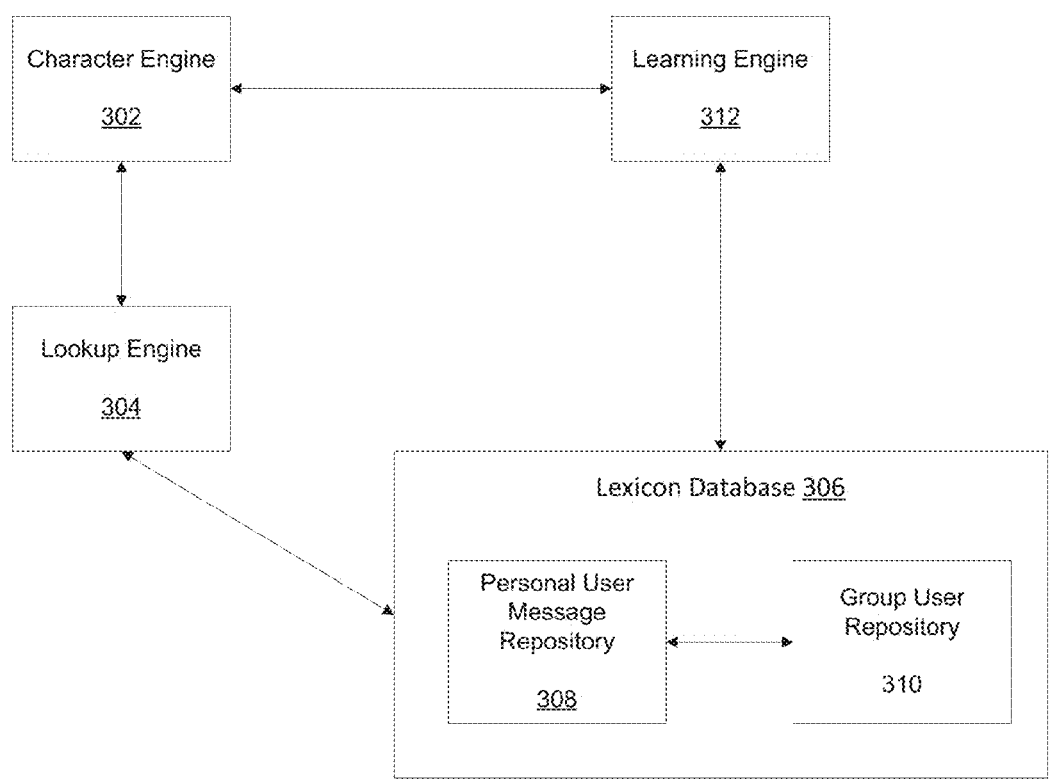
FIG. 3 is a system for predicting diverse and personalized message completions in accordance with some embodiments of the present disclosure.

FIG. 3 illustrates an example system 300 for message (or text/character) prediction according to embodiments of the present disclosure. System 300 is configured to predict a word or words based upon user input and user(s) behavior. The components of system 300 may be embodied upon a single computing device or a combination of computing devices, as discussed above with respect to FIG. 1. Indeed, the engines and components of system 300 could be hosted on a server(s) or user computing device, or any combination thereof. System 300 includes a character engine 302, lookup engine 304, learning engine 312 and a lexicon database 306. The lexicon database 306 includes a personal user message repository 308 and a global user repository 310. The repositories 308 and 310 associated with lexicon database 306 may be embodied within the whole of the lexicon database 306, or may be individual repositories (or databases) which are in connection with lexicon database 306, or a combination thereof. Additionally, embodiments exist where the repositories 308 and 310 can be a single repository, where the information stored within each repository is stored as a single collection of data/information. It should be understood by those of skill in the art that the system can include additional or fewer components, and that a component can perform multiple capabilities or functionalities discussed herein.

Character engine 302 is configured to receive input and/or a selection of characters from a user. For example, the user may enter text using a touchscreen device, keyboard, or other known or to be known input device, and the entered text or other user input may be received by the character engine 302. It should be understood that such text may herein be referred to as a received character set of one or more characters because the text generally comprises at least one character. As discussed in more detail below, the input data received from the user by the character engine 302 (e.g., input of text and/or selection of a message completion) can be communicated to the lexicon database 306 via the learning engine 312. This ensures that the behavioral data housed in the lexicon database 306 (e.g., the personal user message repository 308 and the global user repository 310) is up to date and reflects real-time messaging behavior of the users, as discussed in more detail below. Character engine 302 is operably coupled to the lookup engine 304 and is configured to transmit the received character set of one or more characters to the lookup engine 304.

In some embodiments, the character engine 302 may continue to receive additional input from the user after the initial first set of one or more characters (or prefix) are transmitted to the lookup engine 304. Thus, according to some embodiments, character engine 302 is configured to transmit the additional input (e.g., or updated input) to the lookup engine 304 after each input (e.g., keystroke). Therefore, the lookup engine 304, for example, can update the search to identify a range that corresponds to words in light of the additional characters (e.g., in real-time).

Lookup engine 304 is configured to compile a listing of message completions (or suggestions) based on the received character set and the information comprised within the lexicon database 306 (by way of non-limiting example the information within repositories 308 and 310). That is, the lookup engine 304 is in communication with the lexicon database 306 and provides the input character set received from the character engine 302 as a request to the lexicon database 306. In some embodiments, the lookup engine 304 performs the searching the lexicon database 306, and in some embodiments, the lookup engine 304 provides a request for information to the lexicon database 306, where the information retrieved respective the request is provided as a response to the lookup engine 304. As discussed in more detail below, the lookup engine 304 receives the character set, referred to as a prefix, and produces a listing of message completions corresponding to one or more words that matches, or otherwise corresponds to, the received character set of one or more characters. That is, the lookup engine 304 is configured to identify one or more words and, in some embodiments, corresponding unique identifiers, related to a received prefix. As discussed herein, a "prefix" is a character set comprising one or more characters that forms the base or root of a word, words or phrase. For example, a received character set for the characters "par" is a prefix and is related to the words "par", "parents" "particle" and other words beginning with the first three characters "par."

As discussed above and described in more detail below, the lookup engine 304 is operably coupled to the lexicon database 306, which includes the personal user message repository 308 and the global user repository 310. As a whole, the lexicon database 306 comprises a lexicon of one or more words, by way of non-limiting example a vocabulary, or a dictionary or catalogue of words. These words are utilized to produce message completions for received character sets (or a received prefix). As discussed in more detail below, each repository 308 and 310 comprises a lexicon. The lexicon for the personal user message repository 308 is a string or word lexicon for specific users. That is, each user on the network has a profile that houses information respective each specific user, which includes a personalized lexicon based on the user's message behavior. The global user repository 310 houses a global lexicon. That is, the global user repository 310 comprises information related to all users' messages irrespective specific users. Thus, repository 310 is a global catalogue of messages (e.g., words and phrases) respective lexical norms and conventions.

According to some embodiments, each lexicon in the repositories 308 and 310 comprises one or more words arranged alphabetically, and in some embodiments, the words are arranged according to known or to be known language models. The words in the lexicon can be assigned a unique identifier, such as, but not limited to, a number or value. Unique identifiers are generally assigned such that words sharing a prefix (as in the above example, "par") have contiguous identifiers. In some embodiments, n-grams may be encoded using these word identifiers. As understood by those of skill in the art, an n-gram involves computational linguistics for a contiguous sequence of n-items from a given sequence of text. Thus, in the lexicons within repositories 308 and 310, the one or more words (or character sets or phrases) can be arranged according to a language model utilized for predicting the next item in such a sequence. It should be understood that any known or to be known arrangement or model (e.g., Markov model) and/or algorithm can be used for arranging one or more words, and identifying such one or more words in the lexicon database 306 (e.g., repositories 308 and 310). Thus, according to some embodiments, given a prefix, a resulting n-gram can be quickly indexed without indexing letter based representations. Therefore, based upon a user inputted character set of one or more characters, which defines a prefix, a range of unique identifiers corresponding to words comprising the defined prefix may be identified. It should be understood by those of skill in the art that letter based representations can be utilized, in accordance with some embodiments of the present disclosure.

By way of a non-limiting example solely for illustration purposes and not intended to limit the scope of the present disclosure, the word "parent" may be assigned the identifier "101" and the word "parents" may be assigned the number "101". The incrementation of a value for the word "parents" from "parent" is due to the word "parents" following the word "parent" alphabetically in the lexicon, for example. According to some embodiments, because the respective words are uniquely identified sequentially, given a text string such as a word prefix, a range of unique identifiers that are associated with words having the given word prefix may be identified. For example, if the prefix "par" were inputted by a user, unique identifiers 100 through 199 may be identified if the words (or phrases) associated with the unique identifiers of 100-199 begin with the prefix "par" or are conjugations of the prefix. It should be understood that generally no two words (or messages) in a lexicon are associated with the same unique identifier. That is, a unique identifier should be unique to merely one word/message in the lexicon.

In another example, according to some embodiments, the lookup engine 304 searches for substantially all of the words in a lexicon (e.g., repositories 308 and 310) that comprise the given prefix, and based upon the identification of words, can identify unique identifiers for respective words having prefixes that match the given prefix. In another embodiment, the lookup engine 304 merely searches for a first word alphabetically in the lexicon that begins with the given prefix and a last word alphabetically in the lexicon that begins with the given prefix. If the unique identifiers are assigned to the words sequentially and/or contiguously, words that fall between the first word and the last word that begin with the given prefix will have a unique identifier that falls between a unique identifier range corresponding to the first word and a unique identifier corresponding to the last word. Thus, according to some embodiments, a range of unique identifiers corresponding to words with the given prefix can be determined by the lookup engine 304 by identifying substantially all of the words that have the given prefix (e.g., and recording their respective unique identifiers) and/or by merely identifying the first and last word alphabetically that have the given prefix (e.g., and identifying a range of unique identifiers beginning with a unique identifier corresponding to the first word alphabetically that has the given prefix and ending with a unique identifier corresponding to the last word alphabetically that has the given prefix).

As discussed in more detail respective FIG. 4 and as an overview of the components of FIG. 3, a user inputs a prefix of a word received by the character engine 302 which is transmitted to the lookup engine 304. Based on the prefix, a listing of messages is fetched from the lexicon database 306. More specifically, a listing of words beginning with the received prefix, and each word's associated usage score is identified (or fetched) from the personal user message repository 306, discussed below. The global user repository 310 receives this word listing, and fetches all messages from a global listing that are most similar to each word in the list received from repository 308, as discussed below. This message list is then ranked according to overall usage and displayed to the user for selection of a message completion (or auto-complete) feature within a messaging application.

As discussed above, the lexicon information housed within the repositories 308 and 310 can be arranged in accordance with various models in order to preserve an efficient and accurate retrieval of messages as suggestions for message completions. In addition to the personal lexicon for each user, the personal user message repository 308 also houses information related to message usage behavior respective the words in the lexicon. That is, for each word (or message) in the lexicon, there is associated data respective message activity by a user and a global index of all users. This data is compiled for each user and stored in a directory or profile associated with each user. This data comprises a score (h) related to the number of times a specific user used the word(s) upon sending a message. Also associated with each word in repository 308 is a score (j) related to the number of times all users, from a global index, use the word(s) in a sent message. Therefore, score (h, j), which is respective sender activity, comprises indications respective the number of times a specific user utilized a suggested word upon sending a message(s), and the number of times all users/senders utilized the suggested word upon sending a message(s). For example, Bob has sent the message "hello" to 100 users, and all senders have sent the word "hello" as a message 400 times. Therefore, the score compiled for the word "hello" includes both scores respective Bob and all users: (100, 400). Based on this information, a historical score (s, j) is compiled and stored in repository 308. The historical score reflects message activity over a network for each word in the lexicon respective specific recipients. Specifically, the historical score (s, j) is a summation of (h, j), the absolute count of the number of times a word was sent to a given recipient, and the number of times the word was sent to other recipients normalized by the frequency of interactions between the sender and such recipients. In some embodiments, the frequency of interaction is specific to a relationship between a sender and a specific recipient, and in some embodiments, the frequency is respective interactions between the sender and all recipients.

As discussed above, the global user repository 310 comprises a message lexicon for all users. The global user repository 310 also stores information for determining which messages satisfy an occurrence threshold and meet a certain confidence level in order to generate a listing of message suggestions to the user. The global user repository 310 includes information associated with each message (e.g., word or words) in the global lexicon that indicates the occurrence count of each message on a global scale. That is, the occurrence count for each message is compiled for all senders and recipients such that each time a word is selected or used as or in a message, the occurrence count can be incremented to reflect this. In some embodiments, in order for a message(s) to be fetched from the global lexicon, the message must satisfy an occurrence threshold, which ensures that a certain level of anonymity is preserved. After generation of the message list, where each message satisfies the occurrence threshold, the messages in the list are ranked. As discussed in more detail below, this ranking is a linear combination of the usage scores for the messages on the message list and the occurrence score housed in the global user repository 310. Additionally, in some embodiments, a confidence level must be satisfied or met for generated list, which is based upon a compilation of the scores for each message in the message listing. If this compilation of scores (or total score) is above confidence threshold, then the list can be provided (or displayed) to the user. This level ensures that the scores from the repositories 308 and 310 for each word and message in the list are above a certain level thereby preserving a personalized message listing for presentation to the user. In some embodiments, if the list or words within the list are below the confidence threshold, a null message can be returned, or no suggestions are provided.

The information housed within the personal user message repository 308 and the global user repository 310 is learned over time by collecting each user's messages and analyzing each message to discern each user's message behavior and history. This is performed by the learning engine 310, which compiles data attributes and message usage details for each user on a network into a profile for each user. According to some embodiments, a user's message activity on a network is continuously monitored and user specific information (or user profile information) is compiled and stored within a user profile for each user, which can include, as discussed above, data reflecting message usage regarding specific recipients, specific uses of a word or words in messages, and all other behaviors regarding message activity within messaging platforms. Such information can be based upon, but not limited to, a user's historical or current behavior. In some embodiments, in addition to message behavior being dynamically collected, a user's preferred messages can be pre-defined by the user, or based in part upon the user's demographics or language. Thus, message behavior for a user can be predefined by the user, dynamically compiled based upon the user's message (e.g., texting) activity (past, present or projected), or input in real-time during message creation. Thus, the learning engine 302 collects and maintains this information/data and provides real-time updates to the repositories 308 and 310. The learning engine 302 can be implemented using any known or to be known learning techniques and/or algorithms in order to efficiently and properly compile data related to users' messaging activity on a network or across multiple networks, or on a message platform/application.

FIG. 4 is a process 400 that details the steps performed by components of system 300 for generating message completions suggestions to a user based on received text input (e.g., a prefix). As discussed above, the disclosed systems and methods suggest messages that are automatically learned, personalized and diversified by leveraging messages sent by a large number of users in order to provide message completions that are as engaging as possible. The systems and methods discussed herein learn from recurrent messages sent to a recipient, and instead of simply offering a user a direct completion, as performed by many auto-completion and search query completion services today, for example, the suggested (or predicted) message completions are based upon user behavior and personalized respective each user's intent. Thus, the systems and methods discussed herein compute a ranked list of suggested message completions after every key stroke (or character/text input), and if the list passes a given confidence threshold, it is returned and displayed to the user.

Figure 5A:
FIGS. 5A-5D illustrate non-limiting examples of personalized message completions in accordance with some embodiments of the present disclosure.

In Step 402, as a user begins typing a message in a message text box, the entered text string, referred to as a prefix as discussed above, is communicated to the lookup engine 304. According to preferred embodiments, the text string is communicated to the lookup engine 304 after each keystroke; however, solely for illustration and explanatory purposes regarding the discussion of FIG. 4, the string "goodnig" will be the root/base prefix for finding message suggestions. As illustrated in FIG. 5A, this message, for example, is the text string "goodnig", which was entered in the message text box 502 within message application 500. Therefore, "goodnig" is used as the prefix to identify other words or phrases that begin with "goodnig". According to some embodiments, a client device interacts with a server over a network, e.g., 3G or 4G, and sends any keystroke event as a tuple including the identifier of a sender and recipient, and the text string (referred to as a prefix), e.g., (Sender, Recipient, Prefix). Thus, according to the above example, as Bob enters a message for delivery to Cindy comprising the text string "goodnig", the information communicated to the lookup engine 304 is the tuple: (Bob's identifier, Cindy's identifier, the prefix "goodnig"). According to some embodiments, a sender and recipient's identifier can be any information utilized to identify a user, such as, but not limited to, a telephone number, email address, user name, IP address, device identifier and the like.

In Step 404, the personal user message repository 308 is searched in order to fetch all the words (or text strings) that start with the received prefix. Such text strings will be searched and retrieved respective the tuple: (Sender ID, Recipient ID, Prefix). For example, the repository will be searched for words and/or phrases that relate to the prefix "goodnig", in association with information related to sender Bob, and recipient Cindy. As discussed above, the personal user message repository 308 comprises a personal lexicon for each user. Also, the lexicon of words has stored therewith information (or scores) indicating message activity respective each word. That is, for each word (or message) in the lexicon, there is associated data respective message activity by a user and a global index of all users. As discussed above, this data comprises a score (h) related to the number of times a specific user used the word(s) upon sending a message. Also associated with each word in repository 308 is a score (j) related to the number of times all users, from a global index, use the word(s) in a sent message. Therefore, score (h, j) comprises indications respective the number of times a specific user utilized a suggested word upon sending a message(s), and the number of times all users/senders utilized the suggested word upon sending a message(s). Based on this information, a historical score (s, j) is compiled and stored in repository 308. As discussed above, the historical score (s, j) is a summation of (h, j), the absolute count of the number of times a word was sent to a given recipient, and the number of times the word was sent to other recipients normalized by the frequency of interactions between the sender and such recipients.

Therefore, in view of the above discussion, after receiving the tuple, the repository 308 will be searched to identify a lexicon respective sender Bob, Cindy and "goodnig". As discussed above, searching can be based on identifiers or via an alphabetical search through the lexicon. In some embodiments, the listing of words returned from the search can comprise any number of words/phrases respective all text strings beginning with the prefix, and in some embodiments, the number is capped at a maximum, which can be dynamically altered to accommodate searching and identifying words/phrases more frequently utilized (e.g., common words/phrases). Also, scores will be compiled, determined, or in instances of previous computation, identified respective message usage of the words identified by the prefix. For example, for the prefix "goodnig", if one of the words identified within Bob's lexicon as having the prefix is "goodnight", then the scores (h, j) and (s, j) are also compiled (or identified). That is, the (h, j) score is identified for "goodnight", which indicates the number of times Bob utilized "goodnight" in a sent message, and the number of times all users/senders utilized "goodnight" upon sending a message(s). The (s, j) score are also identified, which is a summation of the (h, j) score, the absolute count of the number of times "goodnight" was sent to a Cindy, and the number of times "goodnight" was sent to other recipients normalized by the frequency of interactions between the Bob and the other recipients (including Cindy). Therefore, from the above example, a listing of words is compiled that matches the prefix "goodnig", and this listing has associated information respective users' message behavior regarding those words on the message listing.

In Step 406, the list compiled from the personal user message repository, referred to as the "personal list", is utilized to search the global user repository 310. That is, the global user repository 310 is searched and a message list is fetched (or identified), where the message list is populated with messages that are most similar to each word on the personal list. As discussed above, the global user repository 310 comprises a message lexicon for all users. This message lexicon is a compilation of all messages that were sent from all users on the network. Associated with each message is an occurrence count that indicates the number of times a message has been sent. This occurrence count is a global counter, which accounts for all user activity. In some embodiments, the occurrence count is specific to a user's activity.

In Step 408, the occurrence count for each message identified in Step 406 is checked against an occurrence threshold. If the occurrence count is at or above the threshold (or satisfies the threshold), then a message listing of suggestions is populated with these messages. In some embodiments, the generated message listing can comprise any number of messages (e.g., words/phrases). Thus, as a result of Step 408, a message list is generated comprising message suggestions for the prefix. Step 410. In preferred embodiments, the number is capped at a maximum, typically 5 messages; however, this maximum can be dynamically altered to accommodate searching and identifying words/phrases more frequently utilized (e.g., common words/phrases). If the determination regarding the occurrence threshold results in no messages satisfying the threshold, then the search for messages may be based solely upon the prefix, and/or identifiers, as discussed above regarding an alphabetical or contiguous searching, where a suggestion list is generated and displayed based on a straight forward search irrespective the steps and computations, as discussed above. Step 412.

In Step 414, the messages on the generated message list are ranked to identify the messages that are of more use to a user, such that they are diverse and personalized. The ranking of the messages is based upon a linear combination of the scores associated with the messages on the message list and the occurrence scores associated with each message. These scores are a product of observed behavior of the sender user and/or other users/senders on the network by the learning engine 312, as discussed above. As such, the messages with the higher scores are placed higher, or have a higher priority than lower scoring messages in the message list. In some embodiments, the scores from the above ranking for all messages on the list are added together, and this total score is compared against a confidence threshold/level. Step 416. If the total score satisfies the confidence threshold, then the message list is displayed to the user, as in Step 420 below. If the total score is below the confidence threshold, a null message may be returned to the user, or no suggestions will be provided. Step 418.

Figure 5B:
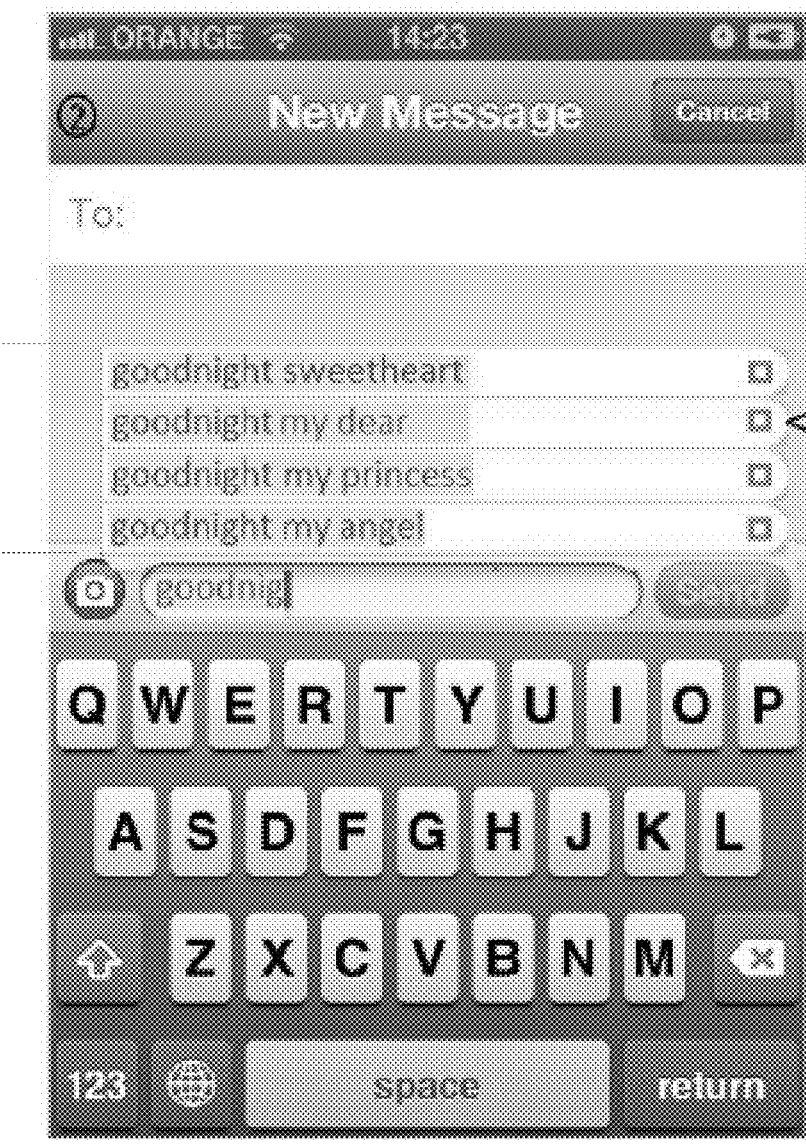
Figure 5C:
Figure 5D:

In Step 420, the generated message list is displayed to the user as a listing of message suggestions for message completions. This is illustrated in FIG. 5B, where for the prefix "goodnig", the message list 504 of ranked suggestions is displayed adjacent to the message text box 502. The message list 504 comprises a listing of "goodnight sweetheart", "goodnight my dear", "goodnight my princess", and "goodnight my angel". Here, the user (e.g., Bob) can then select a message from the displayed message list 504, or can continue typing. Step 422. Should the user select a message 504a from the listing 504, the selected suggestion (e.g., message) 504a is then displayed in the message text box 502, where the text string "goodnig" is replaced with the suggestion 504a. Step 424. As illustrated in FIG. 5C, Bob selected "goodnight my dear" 504a, therefore it was displayed in the message text box 502. As illustrated in FIG. 5D, the user can then send the message by selecting the send button 506 within the message application 500. If the user should continue typing, then the process 400 repeats (or returns to Step 402). Step 426. For example, should Bob, after being presented with message list 504 continues typing the letter "h", it will be appended to the previous text string "goodnig" (i.e., prefix), and the process 400 will repeat for the new text string "goodnigh". In other words, for every key stroke (or text/character input), a ranked list of suggested message completions is computed, and if the list passes a given confidence threshold, it is returned and displayed to the user.

Figure 6:
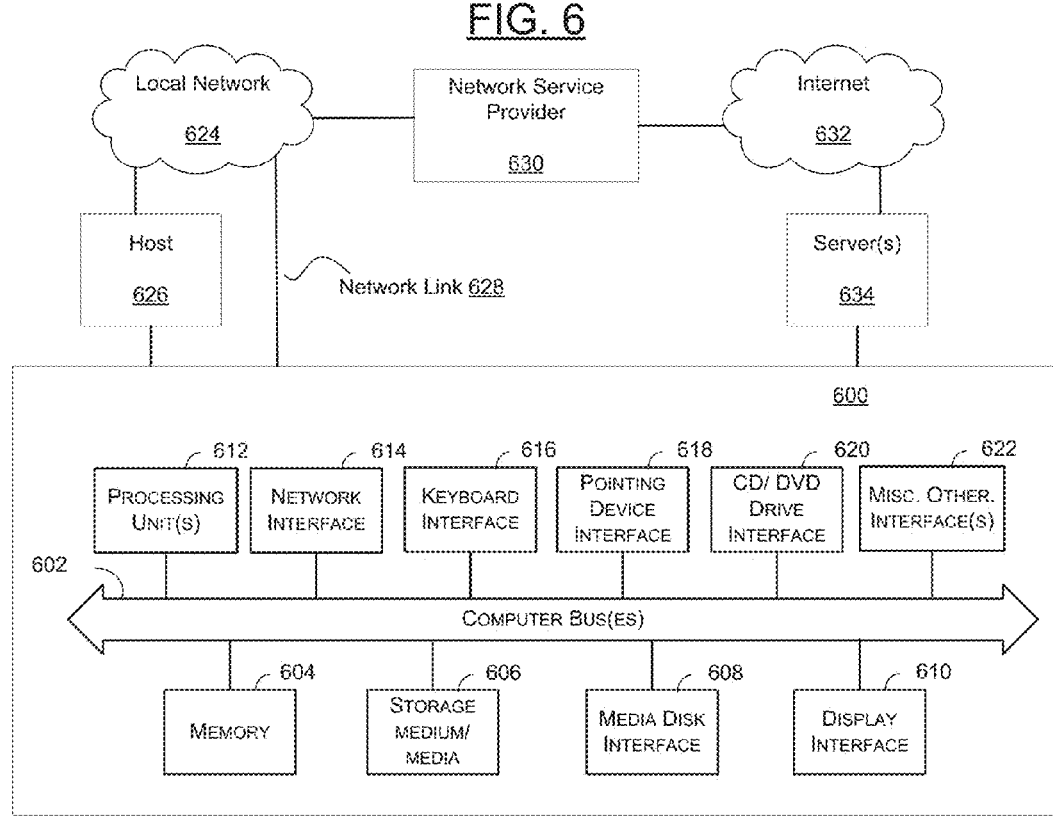
FIG. 6 is a block diagram illustrating architecture of a hardware device in accordance with one or more embodiments of the present disclosure.

As shown in FIG. 6, internal architecture 600 includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), media disk drive interface 620 as an interface for a drive that can read and/or write to media including removable media such as floppy, CD-ROM, DVD, media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces and a universal serial bus (USB) interface.

Memory 604 interfaces with computer bus 602 so as to provide information stored in memory 604 to CPU 612 during execution of software programs such as an operating system, application programs, device drivers, and software modules that comprise program code, and/or computer executable process steps, incorporating functionality described herein, e.g., one or more of process flows described herein. CPU 612 first loads computer executable process steps from storage, e.g., memory 604, computer readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 628 typically provides information communication using transmission media through one or more networks to other devices that use or process the information. For example, network link 628 may provide a connection through local network 624 to a host computer 626 or to equipment operated by a Network or Internet Service Provider (ISP) 630. ISP equipment in turn provides data communication services through the public, worldwide packet-switching communication network of networks now commonly referred to as the Internet 632.

A computer called a server host 634 connected to the Internet 632 hosts a process that provides a service in response to information received over the Internet 632. For example, server host 634 hosts a process that provides information representing video data for presentation at display 610. It is contemplated that the components of system 600 can be deployed in various configurations within other computer systems, e.g., host and server.

At least some embodiments of the present disclosure are related to the use of computer system 600 for implementing some or all of the techniques described herein. According to one embodiment, those techniques are performed by computer system 600 in response to processing unit 612 executing one or more sequences of one or more processor instructions contained in memory 604. Such instructions, also called computer instructions, software and program code, may be read into memory 604 from another computer-readable medium 606 such as storage device or network link. Execution of the sequences of instructions contained in memory 604 causes processing unit 612 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 600. Computer system 600 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 602 as it is received, or may be stored in memory 604 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, at a computing device over a network, message input entered by a first user in a messaging application running on a mobile device associated said first user, said message input responsive to said first user drafting a message for delivery to a second user, said message input comprising a character string of at least one character, an identifier of said first user and an identifier of said second user;
   searching, via the computing device, a lexicon database for a set of messages sent from the first user to the second user based on the first user identifier and the second user identifier, said message set comprising a plurality of messages that begin with the character string, said messages comprising a word or phrase, and each message has associated therewith a score indicating a frequency of use by the first user when messaging the second user;
   ranking, via the computing device, the messages in the message set based on said score, said ranking causing a message with a higher score to be ranked higher than those with a lesser score;
   communicating, via the computing device over the network, a ranked listing of messages to said first user for display in the messaging application;
   receiving, at the computing device, an additional input from said first user in response to the display of the ranked message set, said additional input comprising an additional character entry associated with the character string, said additional character entry and the character string resulting in an augmented input;
   searching, via the computing device, the lexicon database for a third set of messages sent from the first user to the second user based on the augmented input, said third message set comprising a plurality of messages comprising a word or phrase that begin with the augmented input, each third message has associated therewith a score indicating a frequency of use by the first user when messaging the second user;
   ranking, via the computing device, the third messages in the third message set based on said third score, said ranking causing a third message with a higher score to be ranked higher than those with a lesser score; and
   communicating, over the network, a third ranked listing of messages to said first user for display in the messaging application.

2. The method of claim 1, further comprising:
   receiving a second message input from the first user, said second message input responsive to said first user drafting a message for delivery to a third user, said message input comprising a second character string of at least one character, the identifier of said first user and an identifier of said third user;
   searching the lexicon database for a second set of messages sent from the first user to the third user based on the first user identifier and the third user identifier, said second message set comprising a second plurality of messages that begin with the second character string, said second messages comprising a word or phrase, and each second message has associated therewith a score indicating a frequency of use by the first user when messaging the third user;
   ranking the messages in the second message set based on said second score, wherein a second message with a higher score is ranked higher than those with a lesser score; and
   communicating a second ranked listing of messages to said first user for display in the messaging application.

3. The method of claim 1, wherein said additional input is a selection of one message within said ranked message set, wherein upon selection of a message within the ranked message set, the selected message is displayed within a text box of said message application.

4. The method of claim 1, wherein the score for each message is based on observed messaging behavior by the first user when sending messages to the second user, wherein said observed messaging behavior corresponds to a predetermined time period.

5. The method of claim 3, further comprising:
   updating the score for said selected message within said ranked set based on said selection.

6. A non-transitory computer-readable storage medium tangibly encoded with computer-executable instructions, that when executed by a processor associated with a computing device, perform a method comprising:
   receiving, over a network, message input entered by a first user in a messaging application running on a mobile device associated said first user, said message input responsive to said first user drafting a message for delivery to a second user, said message input comprising a character string of at least one character, an identifier of said first user and an identifier of said second user;
   searching a lexicon database for a set of messages sent from the first user to the second user based on the first user identifier and the second user identifier, said message set comprising a plurality of messages that begin with the character string, said messages comprising a word or phrase, and each message has associated therewith a score indicating a frequency of use by the first user when messaging the second user;
   ranking the messages in the message set based on said score, said ranking causing a message with a higher score to be ranked higher than those with a lesser score;

communicating, over the network, a ranked listing of messages to said first user for display in the messaging application;

receiving an additional input from said first user in response to the display of the ranked message set, said additional input comprising an additional character entry associated with the character string, said additional character entry and the character string resulting in an augmented input;

searching the lexicon database for a third set of messages sent from the first user to the second user based on the augmented input, said third message set comprising a plurality of messages comprising a word or phrase that begin with the augmented input, each third message has associated therewith a score indicating a frequency of use by the first user when messaging the second user;

ranking the third messages in the third message set based on said third score, said ranking causing a third message with a higher score to be ranked higher than those with a lesser score; and communicating, over the network, a third ranked listing of messages to said first user for display in the messaging application.

7. The non-transitory computer-readable storage medium of claim 6, further comprising:

receiving a second message input from the first user, said second message input responsive to said first user drafting a message for delivery to a third user, said message input comprising a second character string of at least one character, the identifier of said first user and an identifier of said third user;

searching the lexicon database for a second set of messages sent from the first user to the third user based on the first user identifier and the third user identifier, said second message set comprising a second plurality of messages that begin with the second character string, said second messages comprising a word or phrase, and each second message has associated therewith a score indicating a frequency of use by the first user when messaging the third user;

ranking the messages in the second message set based on said second score, wherein a second message with a higher score is ranked higher than those with a lesser score; and communicating a second ranked listing of messages to said first user for display in the messaging application.

8. The non-transitory computer-readable storage medium of claim 6, wherein said additional input is a selection of one message within said ranked message set, wherein upon selection of a message within the ranked message set, the selected message is displayed within a text box of said message application.

9. The non-transitory computer-readable storage medium of claim 6, wherein the score for each message is based on observed messaging behavior by the first user when sending messages to the second user, wherein said observed messaging behavior corresponds to a predetermined time period.

10. The non-transitory computer-readable storage medium of claim 8, further comprising:

updating the score for said selected message within said ranked set based on said selection.

11. A system comprising:

a processor;

a non-transitory computer-readable storage medium for tangibly storing thereon program logic for execution by the processor, the program logic comprising:

receiving logic executed by the processor for receiving, over a network, message input entered by a first user in a messaging application running on a mobile device associated said first user, said message input responsive to said first user drafting a message for delivery to a second user, said message input comprising a character string of at least one character, an identifier of said first user and an identifier of said second user;

search logic executed by the processor for searching a lexicon database for a set of messages sent from the first user to the second user based on the first user identifier and the second user identifier, said message set comprising a plurality of messages that begin with the character string, said messages comprising a word or phrase, and each message has associated therewith a score indicating a frequency of use by the first user when messaging the second user;

ranking logic executed by the processor for ranking the messages in the message set based on said score, said ranking causing a message with a higher score to be ranked higher than those with a lesser score;

communication logic executed by the processor for communicating, over the network, a ranked listing of messages to said first user for display in the messaging application;

receiving logic executed by the processor for receiving an additional input from said first user, wherein said additional input comprises an additional character entry associated with the character string, said additional character entry and the character string resulting in an augmented input;

search logic executed by the processor for searching the lexicon database for a third set of messages sent from the first user to the second user based on the augmented input, said third message set comprising a plurality of messages comprising a word or phrase that begin with the augmented input, each third message has associated therewith a score indicating a frequency of use by the first user when messaging the second user;

ranking logic executed by the processor for ranking the third messages in the third message set based on said third score, said ranking causing a third message with a higher score to be ranked higher than those with a lesser score; and communication logic executed by the processor for communicating a third ranked listing of messages to said first user for display in the messaging application.

12. The system of claim 11, further comprising:

receiving logic executed by the processor for receiving a second message input from the first user, said second message input responsive to said first user drafting a message for delivery to a third user, said message input comprising a second character string of at least one character, the identifier of said first user and an identifier of said third user;

search logic executed by the processor for searching the lexicon database for a second set of messages sent from the first user to the third user based on the first user identifier and the third user identifier, said second message set comprising a second plurality of messages that begin with the second character string, said second messages comprising a word or phrase, and each second message has associated therewith a score indicating a frequency of use by the first user when messaging the third user;

ranking logic executed by the processor for ranking the messages in the second message set based on said second score, wherein a second message with a higher score is ranked higher than those with a lesser score; and communication logic executed by the processor for communicating a second ranked listing of messages to said first user for display in the messaging application.

13. The system of claim 11, further comprising:

receiving logic executed by the processor for receiving an additional input from said first user in response to the display of the ranked message set, wherein said additional input is a selection of one message within said ranked message set, wherein upon selection of a message within the ranked message set, the selected message is displayed within a text box of said message application.

* * * * *